Jan. 9, 1934.  C. G. WOOD  1,942,677
TORQUE ABSORBING DEVICE
Filed Feb. 9, 1928  2 Sheets-Sheet 1

INVENTOR
Clarence G. Wood
BY Fay, Oberlin & Fay
ATTORNEYS

Jan. 9, 1934.   C. G. WOOD   1,942,677
TORQUE ABSORBING DEVICE
Filed Feb. 9, 1928   2 Sheets-Sheet 2

INVENTOR.
Clarence G. Wood
BY
Day Oberlin & Day
ATTORNEYS

Patented Jan. 9, 1934

1,942,677

UNITED STATES PATENT OFFICE 1,942,677

TORQUE ABSORBING DEVICE

Clarence G. Wood, Cleveland, Ohio, assignor of one-half to The Columbia Axle Company, Cleveland, Ohio, a corporation of Ohio Application February 9, 1928. Serial No. 253,045

1 Claim. (Cl. 192—68)

The present invention relates, as indicated, to a torque absorbing device, and is more particularly concerned with the provision of a resilient connection between the clutch proper and the transmission shaft of a self-propelled vehicle, or other machine. The primary object of the invention is to provide such a resilient connection which will be efficient in its operation, sufficiently sturdy in its construction to withstand the shocks to which it will be subjected, and sufficiently simple to permit assembly, disassembly and repair by the average mechanic.

To the accomplishment of the foregoing and related ends, said invention, then, consists of the means hereinafter fully described and particularly pointed out in the claim; the annexed drawings and the following description setting forth in detail certain mechanism embodying the invention, such disclosed means constituting, however, but one of various mechanical forms in which the principle of the invention may be used.

In said annexed drawings:—

Figure 1:
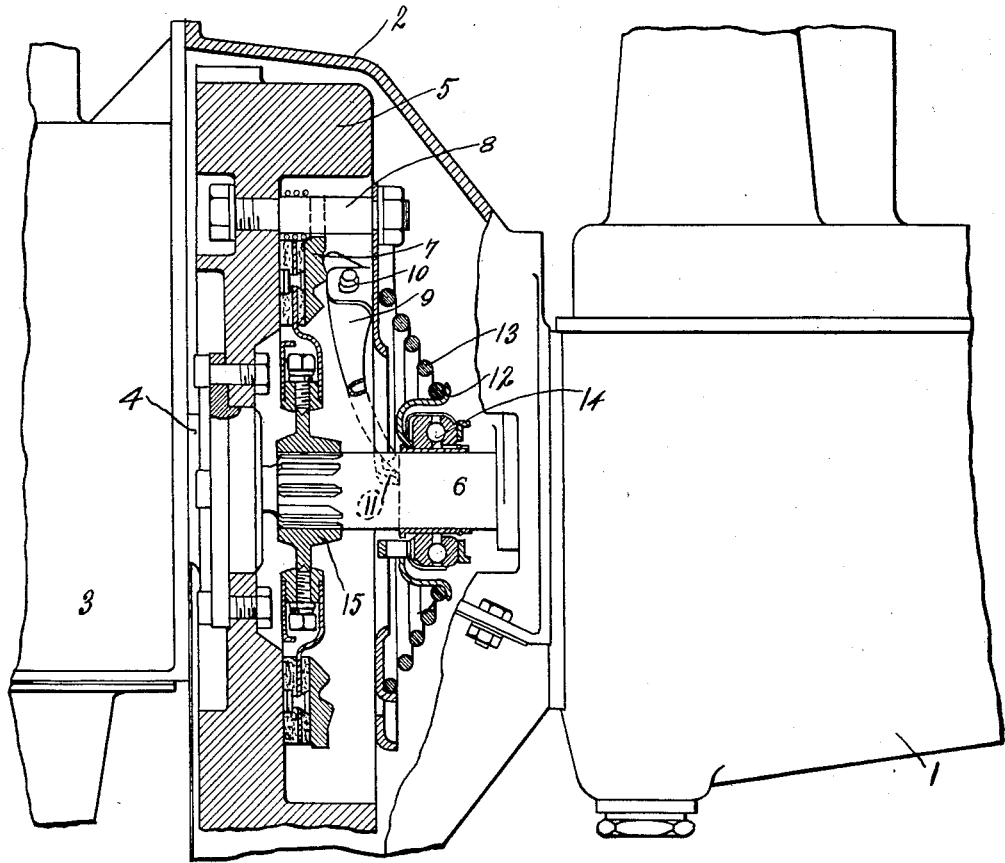
Figure 8:
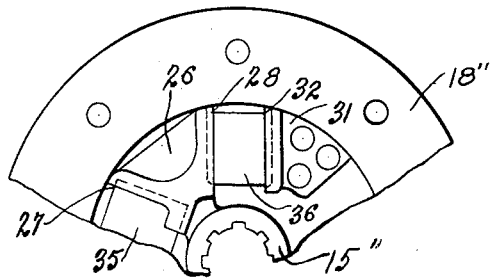
Figure 3:
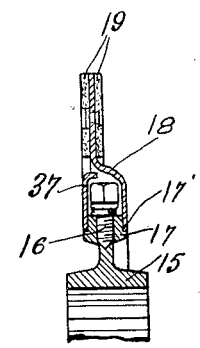
Figure 4:
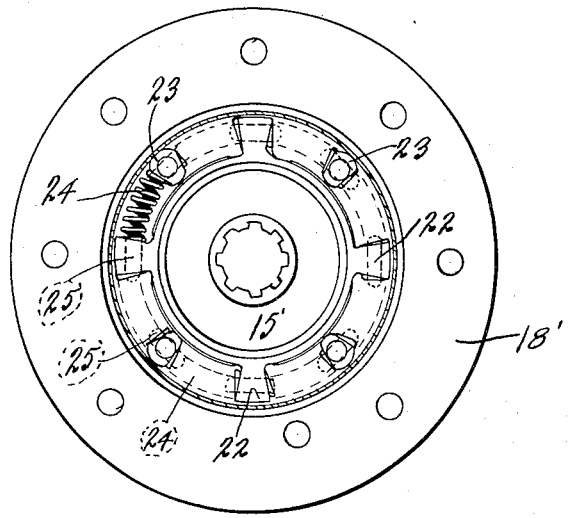
Figure 5:
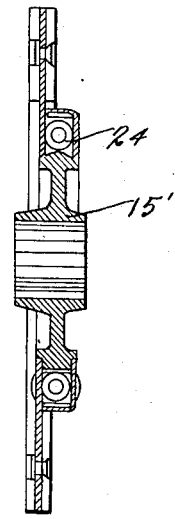
Figure 6:
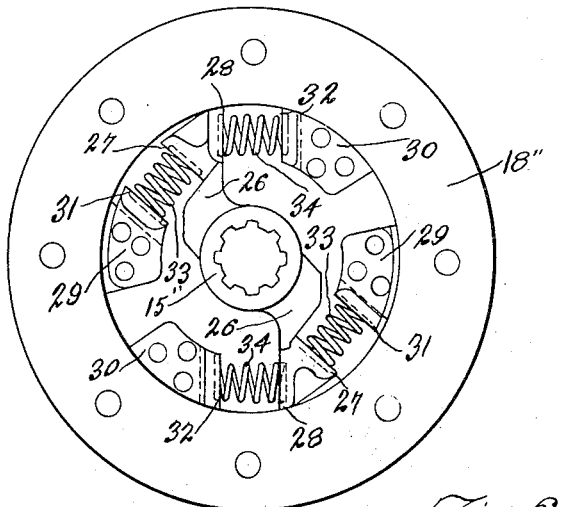
Figure 7:
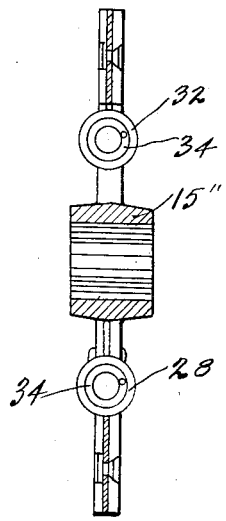
Figure 2:
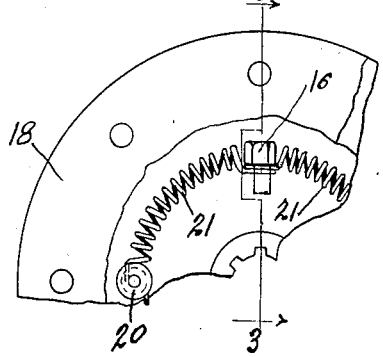

Fig. 1 is a side elevation of a fragment of a motor unit and a fragment of a transmission unit, and a longitudinal section of a clutch unit in which one form of my improvement has been incorporated; Fig. 2 is a front elevation of a fragment of said improvement; Fig. 3 is a vertical section taken substantially upon the line 3—3 of Fig. 2; Fig. 4 is a view similar to Fig. 2 of a modified form of resilient connection; Fig. 5 is a vertical section of the device disclosed in Fig. 4; Fig. 6 is an elevational view of a third form; Fig. 7 is a vertical section thereof; and Fig. 8 is an elevation of a fragment of a fourth form.

Referring more particularly to the drawings, the reference numeral 1 represents a transmission casing to which is connected a clutch housing 2 connected at its opposite end to a motor unit indicated generally at 3. The crank shaft 4 of said motor unit carries within the clutch housing 2 a flywheel 5 which is adapted to be connected to the transmission shaft 6 through my improved clutch.

The clutch proper comprises a ring 7 keyed by means of bolts 8 to the flywheel 5, said ring 7 being pressed against the flywheel 5 through the medium of fingers 9 pivoted at 10 to a plate carried upon the bolts 8 and having their free ends hooked over projections 11 formed upon a bearing washer 12, which is subjected to the effect of a strong compression spring 13. The pressure of the fingers 9 upon the ring 7 may be released by a clutch bearing 14 slidably mounted upon the shaft 6 and reciprocable thereupon by means of a clutch pedal (not shown). All of the above parts are more or less conventional and may take any desired well known form.

A hub 15 is splined to the shaft 6 and, according to the modification disclosed in Figs. 1 to 3, inclusive, is provided with a pair of diametrically disposed bolts 16 threaded into the thickened periphery 17 of said hub. Said bolts 16 extend radially from said hub. A clutch ring 18, provided with friction rings 19 adjacent its periphery, is rotatably mounted with respect to said hub 15. Preferably said clutch ring is journaled upon the hub, the latter being provided with a shoulder 17' for that purpose. Said clutch ring 18 is provided at diametrically opposed points with a pair of transversely extending rivets 20 or the like. Coiled springs 21 connect said clutch ring with said hub, one of said springs extending from each of said bolts 16 to each of said rivets 20. As is clearly shown in Figs. 2 and 3, the adjacent ends of adjacent springs 21 are secured beneath the head of the bolt 16, the opposite end of one of said springs being secured to one of said rivets 20, while the opposite end of the other of said springs is secured to the other of said rivets 20.

It will be seen that I have provided a resilient connection between the flywheel 5 and the shaft 6. The operation of the device is believed to be obvious, but may be briefly reviewed. When pressure upon the clutch pedal (not shown) is released, the spring 13 moves the washer 12 and bearing 14 toward the right end of Fig. 1 to swing the fingers 9 into engagement with the ring 7. Said ring is thus moved toward the left in Fig. 1 to clamp the clutch ring 18 between said ring 7 and the adjacent face of the flywheel 5. The friction rings 19 bearing against the adjacent surfaces of the ring 7 and the flywheel 5 cause the clutch ring 18 to rotate in unison with said flywheel. Such rotation causes compression and extension of alternate springs 21, respectively, and the force of said springs "picks up" the hub 15 and shaft 6 through the medium of the bolts 16. It will be obvious that this resilient connection will cushion any shock of starting which might otherwise be present, and will cause a smooth and even start of the vehicle or other device driven by the transmission shaft 6. Said resilient connection will also cushion the decelerative effect of the engine or other motor unit upon the vehicle or other machine, and will, furthermore, prevent the transmission to the vehicle of the shocks incident upon the "loping" of the engine.

A second embodiment of my invention is shown in Fig. 4, in which the hub 15' is provided with a plurality of equally spaced radial projections 22 and the clutch ring 18 is provided with a like number of similarly spaced transversely extending projections 23. A compression spring 24 is received between each of the projections 22 and the adjacent projections 23, said projections 22 and 23 being formed to accommodate transverse pins 25 upon which the springs 24 are centered. The operation of the last described modification disclosed in Figs. 4 and 5 is essentially identical to the operation of the device disclosed in Figs. 1 to 3, save that no contractile effect of the springs is obtainable, complete dependence being placed upon the expansive effect thereof.

In Figs. 6 and 7 I have disclosed a third embodiment of my invention, in which the hub 15" is provided with a pair of radial projections 26 formed on their outer ends with oppositely faced cup-shaped sockets 27 and 28. The clutch ring 18" is formed with radial inwardly extending projections 29 and 30 formed with corresponding cup-shaped sockets 31 and 32, respectively. A compression spring 33 has its opposite ends received in each of said cups 27 and 31, while a similar compression spring 34 has its opposite ends received in each of said cups 28 and 32. The operation of this modification is practically identical to that of the modification disclosed in Figs. 4 and 5.

A still further modification is disclosed in Fig. 8, in which rubber or like resilient blocks 35 and 36 are received respectively in the sockets 27 and 31, and 28 and 32. The operation of this modification is substantially identical to that of the modification disclosed in Figs. 6 and 7.

Preferably a shield 37 is mounted upon said hub periphery 17 to cooperate with the inner portion of the ring 18 to enclose the springs 21 or 24. Thus dust and mud, and the like, are excluded from said springs, it being obvious that such material would hamper the operation of said springs.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:—

In a clutch, the combination of a hub adapted to be mounted on a shaft to be driven, a bolt screwed into the periphery of said hub normal to the peripheral surface thereof and extending outwardly therefrom, a clutch ring mounted concentrically with respect to said hub and rotatable relative thereto, a pair of diametrically aligned projections on said ring on opposite sides of the center thereof, a spring secured to said bolt and to one of said projections, and a second spring secured to said bolt and to the other of said projections.

CLARENCE G. WOOD.